UNITED STATES PATENT OFFICE.

GEORGE KELLY, OF HINSDALE, ILLINOIS.

FIRE AND WATER PROOF COMPOSITION.

No. 882,891.  Specification of Letters Patent.  Patented March 24, 1908.

Application filed August 29, 1907. Serial No. 390,685.

*To all whom it may concern:*

Be it known that I, GEORGE KELLY, a citizen of the United States, residing at Hinsdale, in the county of Dupage and State of Illinois, have invented a new and useful Fire and Water Proof Composition, of which the following is a specification.

This invention relates to fire and water proof compositions that may be employed for a great variety of purposes, as hereinafter exemplified, and the principal object is to provide a composition of the above character that is very inexpensive, and is thoroughly effective against both fire and water.

The compound consists exclusively of liquid glass and a water proof material of the asphaltum type. The term bituminous substance has therefore been selected as a broad designation to include pitches, tar, resin, and the different grades of commercial asphaltum. Among these materials, coal tar is probably preferred, and the following may be given as a specific example that has proven entirely successful.

Liquid coal tar, either crude or refined, that weighs about twelve pounds to the gallon is thoroughly mixed with liquid glass, preferably at about forty degrees Baumé, which will also weigh about ten pounds to the gallon. These two ingredients in the proportions stated, are readily intermingled, forming a perfect chemical union without any sediment or separation.

Now it is well known that tar alone is a very inflammable substance, but that it has water-proof qualities. It is a comparatively inexpensive product and abundant. On the other hand, liquid glass is absolutely fire proof, but not water-proof. That is to say, it is affected by moisture, and will dissolve in a damp place or in water. I have discovered, however, after a long series of experiments that by combining the two articles named in about equal parts by weight and without any other ingredients whatever the composition is absolutely fire proof and water proof. On the other hand, if the proportions are varied to any great extent, the efficacy of the lesser ingredient is destroyed. For instance, a cardboard saturated with the composition in proper proportions has been subjected to an intense heat for an extended time without being materially affected, and a box constructed of straw-board and coated with the composition was placed upon a sheet iron heated red hot and water was boiled therein for over an hour without affecting the box or its coating, whereas another board treated with a composition containing a less amount of the liquid glass was consumed immediately.

I am aware that many compositions have been proposed that employ among the numerous ingredients, tar and liquid glass, but in every case of which I am aware, the proportions of these two are so small that they cannot have any appreciable effect as is secured by my composition; they are not properly balanced or there are other ingredients that negative their action and destroy their effect.

The mixing of the tar and liquid glass appears to practically result in a new article or substance, inasmuch as there is a chemical union between the two. That is to say, the caustic in the liquid glass appears to neutralize the acids in the tar, and there is no separation after they have been united. The mixture at all times remains ready for use, and there is no necessity of melting, heating or otherwise softening it. In practice, the material is preferably stored in barrels, and when drawn from said barrels, can be immediately applied to the work in hand.

While the material may be employed for a great many purposes, it is peculiarly useful as a cement in cold storage work. Heretofore there has been no practical method of securing the insulating material to the walls of cold storage buildings, refrigerator cars, and the like, except by nails, wiring, pegs, and the like, which devices are not only detrimental to the insulation but are conductors of heat. Portland cement and similar materials have been tried, but these are expensive, and it has been found that they deleteriously affect the insulation. The present composition, however, is found entirely satisfactory for the purpose, and can be also employed as a protective coating over the outer surface of the insulation. It may also be used as a covering or a surface coat for switch boards, wires, tapes, and the like, and in fact in any place where a fire and water proof covering is desirable. When applied, it has very great adhesive qualities, and becomes exceedingly hard. Moreover, its adhesive qualities are due to the combination of the elements, neither of which alone would answer the purpose. The tar evaporates and enters into the material, leaving no holding surface, and while silicate of soda or liquid glass has adhesive qualities, it will only hold in a dry place. If it has to be put where there is dampness, the liquid glass then loses its stated qualities, and softens and disintegrates. On the other hand, in the mixture, the ingredients coöperate, so that one sustains the other, and the adhesive qualities are not affected, either by heat or dampness.

I have already given the proportions where the liquid glass is at forty degrees Baumé, and the tar at a certain weight. It will of course be understood that where the liquid glass or tar employed is of a different consistency, the amount must be changed, although the actual body is not altered. For instance, if the liquid glass is of a lighter weight than that set forth above, then more of it would be required, and the same holds true if the tar is thicker or of a heavier weight than that mentioned.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent is:—

1. A composition of the character set forth, consisting exclusively of bituminous substance and liquid glass.

2. A composition of the character set forth, consisting exclusively of coal tar and liquid glass.

3. A composition of the character set forth, consisting exclusively of substantially equal parts of bituminous substance and liquid glass.

4. A composition of the character set forth, consisting exclusively of substantially equal parts of coal tar and liquid glass.

5. A composition of the character set forth, consisting of substantially equal parts by weight of coal tar and liquid glass, the latter being at substantially forty degrees Baumé.

In testimony that I claim the foregoing as my own, I have hereto affixed my signature in the presence of two witnesses.

GEORGE KELLY.

Witnesses:
W. A. SHERMAN,
FRANK E. HANSCOM.